Oct. 23, 1956  R. M. CARRIER, JR., ET AL  2,767,826
DE-AERATING CONVEYOR
Filed June 21, 1952

INVENTOR.
ROBERT M. CARRIER JR.
BY  JOHN M. MORRIS
Oberlin & Limbach
ATTORNEYS

UNITED STATES PATENT OFFICE

2,767,826

DE-AERATING CONVEYOR

Robert M. Carrier, Jr., and John M. Morris, Louisville, Ky., assignors to Carrier Conveyor Corporation, Louisville, Ky., a corporation of Kentucky Application June 21, 1952, Serial No. 294,883

1 Claim. (Cl. 198—220)

The present invention relates generally as indicated to a de-aerating conveyor and more particularly to a vibrating conveyor of the directional throw type in which material to be conveyed is conveyed by vibration of the conveyor trough or pan obliquely relative to its material supporting surface whereby the material is tossed forwardly and upwardly and thereby conveyed lengthwise of the supporting surface of the pan or trough.

It is one principal object of this invention to provide a unique form of conveyor trough or pan which is divided lengthwise into a series of wedge-shaped conveying portions operative to de-aerate and compact fluffy materials and thereby greatly increase the conveying capacity of the conveyor.

Other objects and advantages will become apparent as the following description proceeds.

To the accomplishment of the foregoing and related ends, the invention, then, comprises the features hereinafter fully described and particularly pointed out in the claim, the following description and the annexed drawing setting forth in detail one illustrative embodiment of the invention, this being indicative, however, of but one of the various ways in which the principle of the invention may be employed.

Before explaining the distinctive features of the present invention it should be pointed out that in the ordinary vibrating conveyor when the mat of comparatively dry granular material is conveyed by progressive throwing forward and upward relative to the conveyor pan, the mat is separated from the suppotring surface of the trough and the void space under the mat becomes filled with air. In a conventional vibrating trough having upstanding parallel sides, if the mat of conveyed material consists of fine paticles of low specific gravity, the inrushing air will be trapped between the particles and they will be partially held in suspension. This condition is commonly known in the industry as a condition of "aeration." The effect of such aeration is three-fold, viz. the bulk density of the material is reduced and for a given depth of mat and conveying speed the capacity of the conveyor in pounds per hour is proportionately reduced; as a result of interparticle slippage the mean speed of conveying of the mat is substantially reduced, resulting in a further decrease of conveying capacity; and the maximum depth of the mat which the conveyor can transport will be limited by the degree of aeration, this resulting from extreme slippage between the particles and caused by the inability of the lower particles to impart a directional conveying impulse to the upper particles. Thus it is apparent that with the conventional conveying troughs having flat bottom pans and upstanding parallel sides, the conveying capacity of the conveyor is greatly reduced by the use of fluffy materials such as baking flour and the like.

Figure 1:
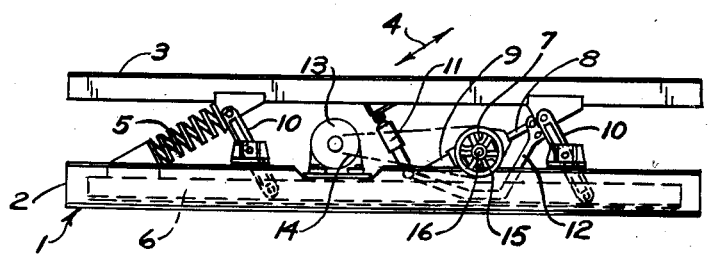
Fig. 1 is a side elevation view of a vibrating conveyor.

In Fig. 1 of the drawing there is illustrated a vibrating conveyor 1 which comprises a frame or base 2 and a conveyor trough 3 supported thereby for vibration along an oblique path as denoted by the line 4.

Said trough 3 is resiliently mounted on springs 5 compressed between said trough and a counterbalance assembly 6 and vibration of said trough and said counterbalance assembly 6 in direct phase opposition is effected as by means of an eccentric drive unit 7 which, operating through the linkage mechanism which includes a connecting rod 8 and a journal block 9 connected to said trough and assembly respectively and links 10 pivotally connected to said trough and assembly at their ends and to said frame 2 intermediate their ends, causes opposite and equal vibrations of said counterbalance assembly 6 and said trough 3. These conveyors 1 are designed for operation at the natural frequencies of said springs 5 and at a predetermined uniform amplitude, and for such purpose an extensible link in the form of a hydraulic shock absorber unit 11 and a link 12 are employed to provide a substantially positive drive of predetermined stroke at the natural frequency of say 500 cycles per minute, for example, and to allow a gradual settling of the trough 3 under varying loads of conveyed material thereon.

Said link 12 is pivotally connected at one end to said trough 3 and at the other end to one end of said unit 11, the connecting rod 8 being pivotally connected to said link 12. Thus, as the load on the conveyor varies, the link 12 will cause lengthening or shortening of the unit 11 without transmitting added load on rod 8 or drive unit 7, and at any settled position of the conveyor the amplitude of vibration will remain constant since at 500 cycles per minute, for example, the unit 11 is for all practical purposes of fixed length.

It is to be understood that for the purposes of the present invention, the vibration of the trough 3 may be induced by means other than herein disclosed and that the particular mechanism herein is to be regarded merely as typical.

Figure 2:
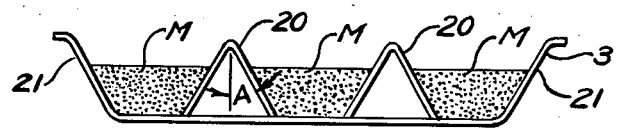
Fig. 2 is an end elevation view, on an enlarged scale, showing our novel form of de-aerating conveyor trough.
Figure 3:
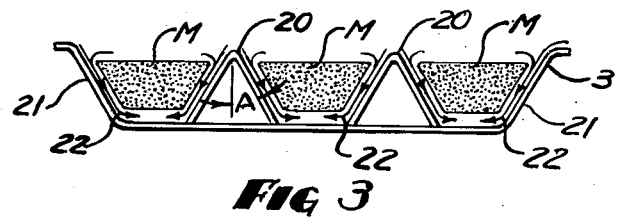
Fig. 3 is a view similar to Fig. 2 except showing the conveyed material thrown upwardly with respect to the material supporting surface of the conveyor trough.

As best shown in Figs. 2 and 3, the trough 3 is provided with de-aerating vanes 20, which, together and with the sloping sides 21 of the trough, serve to divide the mat of conveyed material M into separate sections of wedge or trapezoidal cross-section shape of such proportions as shown that the width of the bottom of each section is comparatively narrow with respect to width of the top of each section, for example nearly 1:2 or less. The maximum width of the bottom of each section for any particular material to be conveyed will be in inverse ratio to its tendency to aerate, or, in other words, the finer the particle size and the lighter its specific gravity and also the closer the individual particles tend to be spherical, the smaller the width of the bottom must be relative to the width of the top. The slope (angle A) of the sides of the de-aerating vanes 20 and of the sides 21 of the trough is not extremely critical and may be varied without substantial change in results between 30° and 70°.

The practical result with the de-aerating vanes is that when the wedge-shaped mats of material are thrown upwardly and forwardly from the bottom surface of the conveyor trough 3, the air or other gas around the conveyor 1 and in contact with the top surface of the mat, flows around the wedge-shaped sections M as represented by arrows 22 rather than through the mat sections, as would be the case where the conveyor trough has parallel upstanding side portions and a wide, flat bottom surface. This flowing of the air or other gas around the mat sections M greatly lessens the tendency for the mat sections to become aerated, thereby resulting in a greater conveyed depth, higher mean conveying speeds, and greater bulk densities, and these factors combined resulting in much higher conveying capacity in pounds per hour.

The de-aerating vanes 20 have the additional function which contributes to de-aerating of the mats M of conveyed material, and that is that because of the wedge shape as shown and the oscillating or vibrating path 4 of rising and falling of the mats during each stroke of the conveyor vibration, the downwardly converging sides of the de-aerating vanes 20 and of the sides 21 of the trough 3 tend to squeeze the mats laterally into a smaller space for thereby squeezing the air or other gases therein by compression. When a very fluffy material such as baking flour, for example, is conveyed in a conveyor having the present de-aerating vanes 20 and sloping trough sides 21, it will be found, upon stopping the conveyor, that such product for the first foot or so of the conveyor trough length will be so aerated that when a person closes his eyes and moves his hand toward the product, it will be extremely difficult to determine at what point the product was contacted with the hand and, in fact, most persons will first get the sensation of feeling something when they touch the bottom of the trough. However, beyond that point of the conveyor trough the product will be found to have been so de-aerated due to the action aforesaid and to the squeezing out of the air therefrom that the surface of the mats M are considerably more solid and can be readily felt as distinct layers on the trough 3. The flow of the air or other surrounding gas around the sides of the mats M and the continued squeezing action keeps the product from becoming re-aerated further along the conveyor trough.

While the cross-section area of the trough 3 equipped with de-aerating vanes 20 is somewhat less than that of a trough not so equipped, it has been found that in spite of this, the conveying capacity of the present trough is considerably greater than the capacity of the ordinary trough. In actual tests with troughs of the same width operating at the same frequency and amplitude it has been found that with de-aerating troughs, the conveyor conveyed pulverized mica with and in a 1½" deep mat at 60 feet per minute whereas in a parallel sided trough, the same material conveyed in a ½" mat at 60 feet per minute.

Still another example is pulverized talc which conveyed at 60 feet per minute with a 2¼" deep mat in a de-aerating trough according to the present invention and with only a ¾" deep mat at 60 feet per minute in a parallel sided trough. It has been further discovered that exploded whole grain cereals, sugar-coated, were conveyed up at 10° slope with a 2" deep mat at 40 feet per minute; and after de-aerating vanes were installed, the same material was conveyed upwardly at the same angle in a 4" deep mat and the speed of conveying was increased to 60 feet per minute.

Other modes of applying the principle of the invention may be employed, change being made as regards the details described, provided the features stated in any of the following claim, or the equivalent of such, be employed.

We therefore particularly point out and distinctly claim as our invention:

Means for de-aerating fluffy materials during conveying and for substantially increasing the conveying capacity of a relatively wide, flat bottom vibrating trough having opposite sides which diverge upwardly at an angle of from 30 to 70° from vertical, comprising a plurality of inverted V-shape partitions secured to the bottom of said trough to extend lengthwise of said trough and upwardly from the bottom of said trough to approximately the same level as the opposite sides of said trough and defining with each other and with the sides of said trough at least three relatively narrow troughs each having opposite sides which diverge upwardly at an angle of from 30 to 70° from vertical and each being of width across the bottom less than about one-half the width across the top, and means for vibrating said trough at a frequency and along a path such that such materials are tossed upwardly and forwardly with respect to said trough, whereby air may readily flow around the relatively deep and narrow beds of such materials and pass therebeneath as such materials are tossed upwardly out of contact with the sides and bottoms of said relatively narrow troughs.

References Cited in the file of this patent

UNITED STATES PATENTS

| | | |
|---|---|---|
| 1,971,292 | Brauer | Aug. 21, 1934 |
| 2,123,189 | Jacobsen | July 12, 1938 |
| 2,164,676 | Appleyard et al. | July 4, 1939 |
| 2,664,995 | Renner | Jan. 5, 1954 |